(12) United States Patent
Noss

(10) Patent No.: US 6,170,835 B1
(45) Date of Patent: Jan. 9, 2001

(54) WORKPIECE CLAMPING APPARATUS

(76) Inventor: Hans Noss, 65307 Bad Schwalbach, Hardtstrasse 23 (DE)

( * ) Notice: Under 35 U.S.C. 154(b), the term of this patent shall be extended for 0 days.

(21) Appl. No.: 09/300,203

(22) Filed: Apr. 27, 1999

(30) Foreign Application Priority Data

Sep. 10, 1998 (EP) .................................................. 98117129

(51) Int. Cl.[7] .............................. B23B 31/30; B23B 31/40
(52) U.S. Cl. ...................... 279/2.07; 279/4.02; 279/4.11; 279/121; 279/126; 279/132; 279/127
(58) Field of Search ..................................... 279/4.01, 4.1, 279/4.11, 4.12, 121, 132, 110, 127, 60, 2.06, 2.07, 2.09, 4.02, 126; 269/25, 27, 33

(56) References Cited

U.S. PATENT DOCUMENTS 5,102,152 * 4/1992 Grund et al. .......................... 279/121

FOREIGN PATENT DOCUMENTS 41 14 884 A1  11/1992 (DE) .

* cited by examiner

*Primary Examiner*—Steven C. Bishop
(74) *Attorney, Agent, or Firm*—Reising, Ethington, Barnes, Kisselle, Learman & McCulloch, P.C.

(57) ABSTRACT

A plurality of clamping motion elements with clamping jaws are moved out of an initial position towards a workpiece under a low operating pressure and caused to bear thereagainst. When all the clamping jaws bear uniformly against the workpiece, a full clamping pressure is applied to clamp the workpiece fast in position.

9 Claims, 6 Drawing Sheets

WORKPIECE CLAMPING APPARATUS

FIELD OF THE INVENTION

The invention concerns a workpiece clamping apparatus.

It will be noted at this point that the term workpiece clamping apparatus embraces both an apparatus with a mechanism adapted to clamp a workpiece on the exterior thereof, which can be referred to as an external workpiece apparatus, such as a chuck, and also an apparatus with a mechanism adapted to clamp a workpiece on the interior thereof, which can be referred to as an internal workpiece clamping apparatus.

BACKGROUND OF THE INVENTION

One form of workpiece clamping apparatus comprises a housing having inclined guides which, as viewed in radial planes thereof, extend inclinedly with respect to the axial direction. A plurality of clamping motion elements are displaceable along the guides and carry clamping jaws for clamping a workpiece to be clamped by the apparatus. A plurality of clamping pistons are associated with respective ones of the clamping motion elements, to provide for clamping the workpiece. The apparatus further includes a displacement actuation assembly which permits the clamping motion elements to be moved into respective released positions and clamping readiness positions in which the clamping motion elements are in a ready position to initiate clamping of the workpiece. An apparatus of that kind is to be found for example in DE-A 41 14 884.

That apparatus has a control member in the form of an actuation disk with the clamping pistons carried thereon, in order to draw respective projections of the clamping motion elements or like clamping bodies against the abutment surface of the actuation disk, thereby to permit displacement of the clamping motion elements. In that way the apparatus closes and the clamping jaws are caused to bear uniformly against the workpiece. The application of clamping pressure to the clamping pistons causes the workpiece which has been previously uniformly embraced to be clamped fast. While that apparatus operates satisfactorily and with a reasonable degree of precision, there are clamping reaction forces which make themselves noticeable at the actuation disk.

Another workpiece clamping apparatus as disclosed in EP 0 800 884 A2 involves the co-operation of motion-producing taper members which are guided in the axial direction and clamping jaws which are guided in radial directions, in order to bear gently against the workpiece before clamping pistons which are actuated by way of a presetting bar definitively clamp the workpiece fast.

SUMMARY OF THE INVENTION

An object of the present invention is to provide a workpiece clamping apparatus so designed as to afford a reduction in reaction forces arising out of a workpiece-clamping procedure.

Another object of the present invention is to provide a workpiece clamping apparatus which provides for an improved workpiece-clamping procedure in terms of precision and delicacy of operation while affording a firm clamping action and enjoying simplicity of structure.

Still another object of the present invention is to provide a workpiece clamping apparatus which is so designed that components can perform a respective plurality of functions.

In accordance with the principles of the present invention the foregoing and other objects are achieved by a workpiece clamping apparatus comprising a housing having inclined guides which, as viewed in radial planes, extend inclinedly with respect to the axial direction of the housing. A plurality of clamping motion elements are displaceable along the inclined guides and carry clamping jaws for clamping a workpiece. A plurality of clamping pistons are each associated with a respective one of the motion clamping elements to cause clamping of the workpiece. A displacement actuation means permits the clamping motion elements to be moved into respective released positions and clamping readiness positions. The clamping pistons are mounted in cylinder chambers which are fixed with respect to the housing and can be acted upon by way of fluid feed ducts which extend in part by way of the displacement actuation means. The fluid feed ducts permit control fluid to be fed to the cylinder chambers selectively either without pressure or with a take-up pressure or with a clamping pressure.

As will become readily apparent from a description hereinafter of preferred embodiments of the workpiece clamping apparatus according to the invention, the displacement actuation means is thus primarily a control fluid feed member.

In addition however the displacement actuation means also involves the function of acting as an abutment for projections on the clamping motion elements which can be displaced controlledly in that way, more specifically into their initial or starting position, in which case the necessary displacement force is applied by way of the displacement actuation means, or into the clamping readiness position, in which case the necessary displacement force is applied by actuation of the clamping pistons.

Further objects, features and advantages of the invention will be apparent from the following description of preferred embodiments.

DESCRIPTION OF THE PREFERRED EMBODIMENTS

Figure 1:
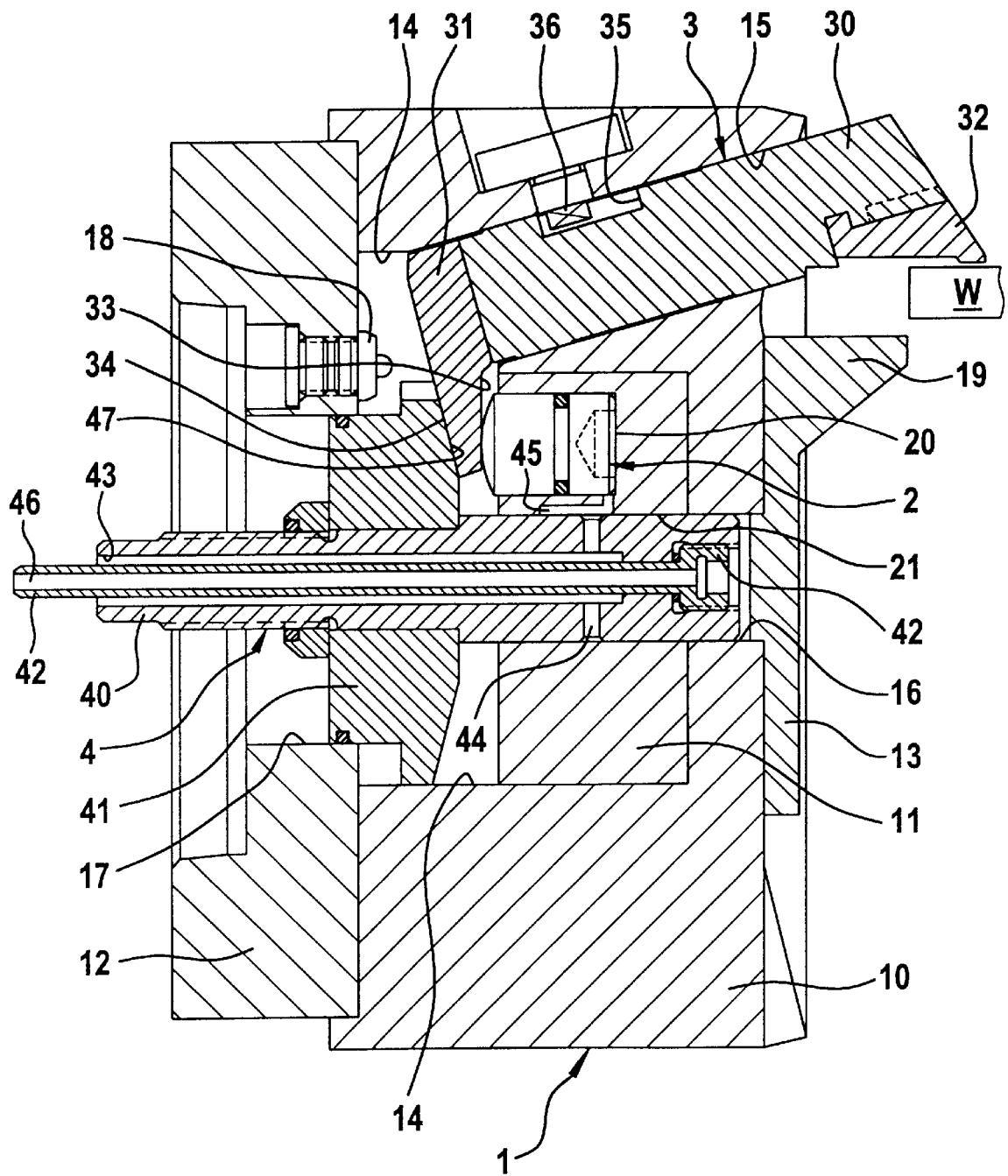
FIG. 1 is a view in axial section through a workpiece clamping apparatus in the form of a clamping chuck in the open position.
Figure 2:
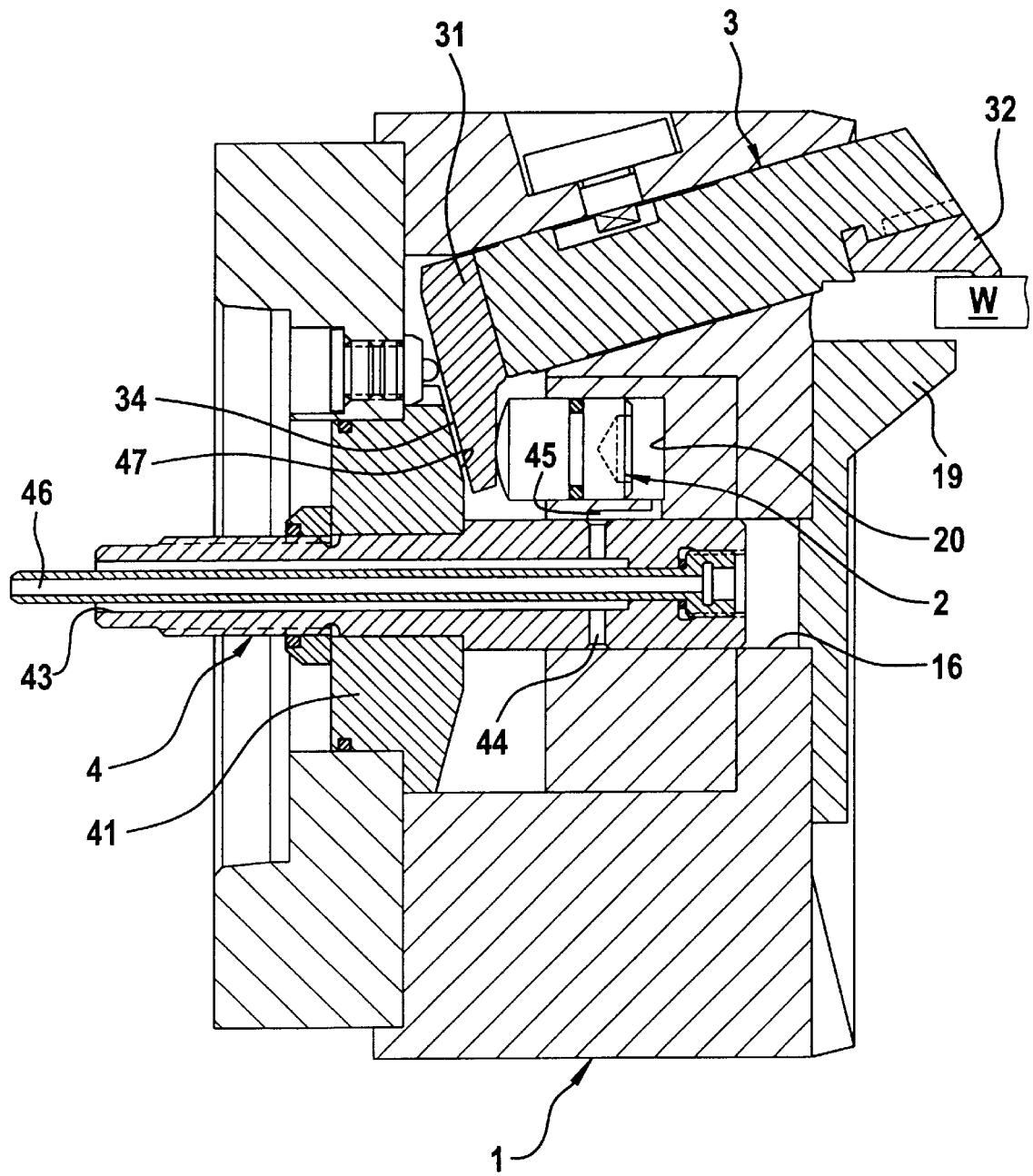
FIG. 2 shows the chuck of FIG. 1 in an initial clamping position.
Figure 3:
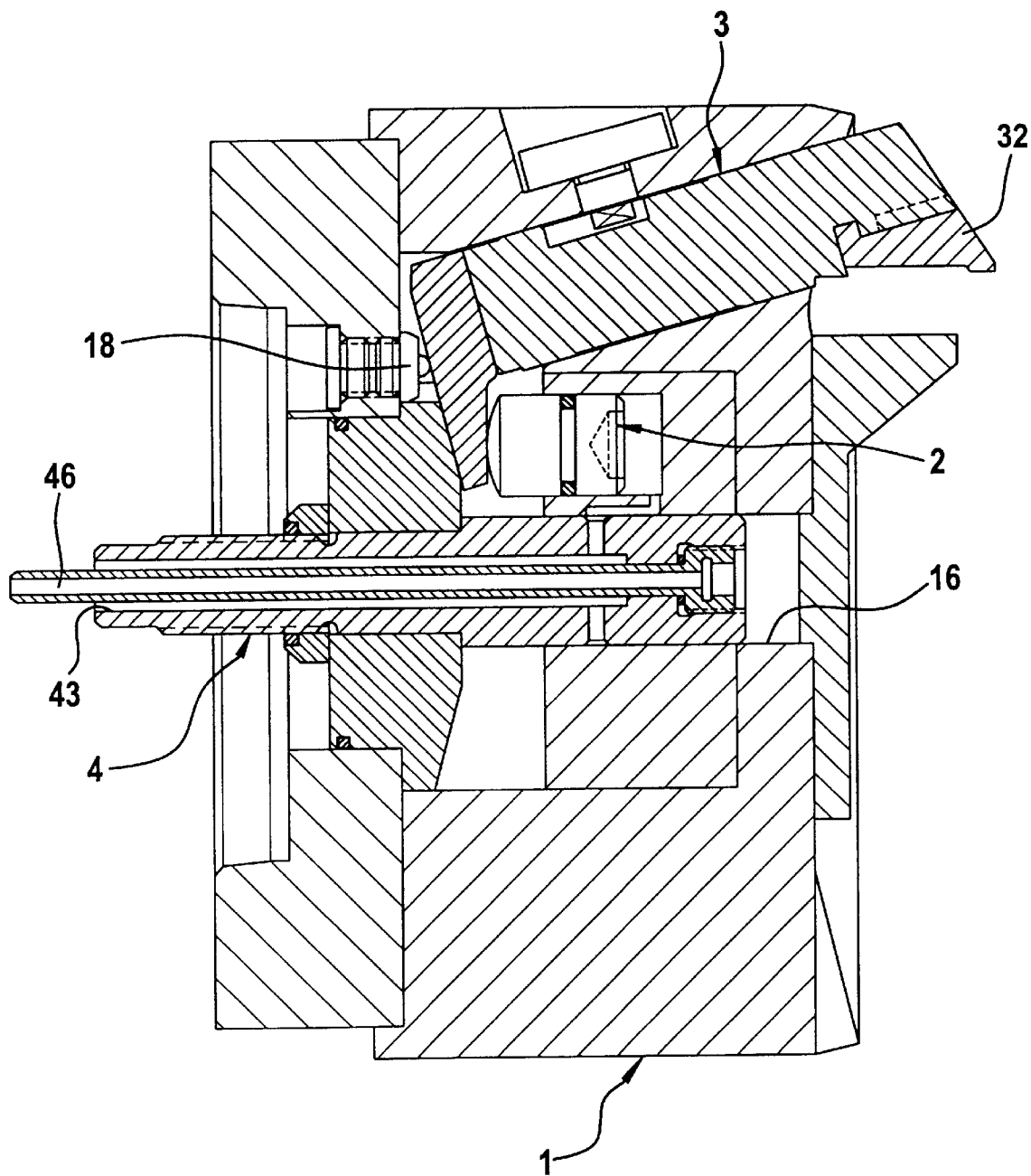
FIG. 3 shows the chuck of FIG. 1 in a closed position.

Referring firstly to FIGS. 1 through 3 but more specifically at this stage FIG. 1, illustrated therein is a workpiece clamping apparatus in the form of an external workpiece clamping apparatus which can be referred to as a chuck, the main components of which comprise a housing as indicated generally at 1, a plurality of clamping pistons 2, a plurality of clamping motion elements 3 and a control member 4 which can be referred to as a displacement actuation means. The housing 1 includes a main housing portion 10, an insert housing 11 and two housing end cover portions 12 and 13 at respective ends thereof.

The main housing portion 10 and the insert housing 11 may also be of an integral configuration. The main housing portion 10 has an internal space 14 therein and a series of inclined guides of which one can be seen at 15. The inclined guides 15 in the form of pin bores lead into the internal space 14. The space 14 is in the form of a stepped bore, as can be clearly seen from FIG. 1, in order to represent a slider bore as indicated at 16. The control member 4 is mounted in a further slider bore indicated at 17 in the housing end cover portion 12. A pin (not shown) also extends into the internal space 14 to prevent the control member 4 from rotating, while reference numeral 18 indicates an abutment sensor or signalling device, the purpose of which will become apparent hereinafter.

Reference numeral 19 denotes counterpart support portions for supporting the workpiece indicated at W in FIG. 1, the portions 19 being disposed on the housing end cover portion 13.

The insert housing 11 is secured in the internal space 14 by screw pins or studs, if it is not formed integrally with the main housing portion 10. The insert housing 11 has a bore indicated at 21 which is precisely aligned with the bore 16 in the main housing portion 10 and is of the same diameter as same. A series of cylinder chambers 20 is disposed in the insert housing 11 in a circular array distributed around the bore 21. The number of cylinder chambers 20 corresponds to the number of inclined guides 15 formed by the bores. The cylinder chambers 20 are arranged in the same radial planes as same. For example the illustrated structure has six cylinder chambers 20 with six clamping pistons 2 arranged in respective ones thereof and six clamping motion elements 3, which are all arranged symmetrically around the displacement actuation device or control member 4.

Each of the clamping motion elements 3 comprises a guide pin 30, and a shoe 31, and a clamping jaw 32 carried by the clamping motion element 3. The shoe 31 has a top side indicated at 33 in FIG. 1 and an underside as indicated at 34 in FIG. 1 and projects into the space 14 in such a way that it is capable of co-operating with an associated clamping piston 2 and the displacement actuation device or control member 4. The shape of the clamping jaws 32 is adapted to the workpiece W to be clamped fast, which has cylindrical or virtually cylindrical surfaces. The clamping jaws 32 are releasably and interchangeably secured to their respective guide pins 30.

The guide pins 30 each have a slot indicated at 35 in the upper part of FIG. 1, into which a guide projection 36 slidably engages in order to permit limited pivotal movement and a restricted stroke movement of the guide pin 30.

The control member or displacement actuation device 4 includes a slider 40, an actuation disk 41 secured thereto and a tubular insert 42. The slider 40 is provided at both ends with a respective stepped bore for the tubular insert 42 to be sealingly inserted therein and to provide space for a fluid distribution duct 43 from which branch radial ducts 44, corresponding to the number of clamping pistons 2. The respective ducts 44 open into associated ducts 45 which each lead into a respective cylinder chamber 20. It will be apparent from FIG. 1 that the ducts 45 have a long, longitudinal branch portion corresponding to the stroke movement of the respective piston 2, and a radial, transverse branch portion. A fluid duct 46 leads through the tubular insert 42 into the space 16 so that the slider 40 can be controlled in respect of its axial movement, as a piston effect. The ducts 44, 45 are sealed off by seal means relative to the spaces 14 and 15.

The fluid distribution duct 43 is in communication with a fluid control device (not shown) which supplies for example hydraulic oil, the arrangement being adapted to afford first, second and third pressure stages, namely a pressure of zero, a take-up pressure which is low as is sufficient to cause displacement of the clamping motion elements 3, and a higher clamping pressure for producing the necessary clamping forces for definitively clamping fast a workpiece W.

The actuation disk 41 has an inclined surface 47 which extends parallel to or bears against the surface 34 of the clamping actuation elements 3, depending on the operating condition of the assembly.

The slider 40 can be displaced with respect to the housing 1 along the bores 16 and 21 in order to move the clamping motion elements 3 into their initial position as shown in FIG. 1, in which the clamping jaws 32 are in an open position.

The structure of the workpiece clamping apparatus of FIGS. 1 through 3 having been described, the mode of operation thereof will now be described as follows:

Upon the return movement of the clamping motion elements 3 into their starting position as shown in FIG. 1, the actuation disk 41 comes into contact at its inclined surface 47 with the surface 34 of the clamping motion elements 3, and displaces them along the guides 15 towards the right in FIG. 1. When that happens the pistons 2 are also entrained towards the right and fluid is displaced out of the cylinder chambers 20 by way of the ducts 45, 44 and 43 into a storage space or reservoir (not shown).

Starting from the above-mentioned starting position shown in FIG. 1, the apparatus is then moved into a condition for clamping readiness or centering of a workpiece W. For that purpose, the control member 4 is displaced towards the left in FIG. 1 and at the same time the above-mentioned take-up pressure is supplied to the respective cylinder chambers 20 by way of the ducts 43, 44 and 45. When that occurs, the pistons 20 displace the clamping motion elements 3 into contact with the actuation disk 41 so that the control member 4 moves towards the left in FIG. 1, synchronously with the pistons 2 and the clamping motion elements 3. This is the motion involved in moving from the condition of the apparatus shown in FIG. 1 to that shown in FIG. 2. When this happens, the radial spacing of the clamping jaws 32 from each other decreases and the clamping jaws 32 come successively into a condition of bearing against the workpiece W at the outside thereof. When this occurs, the reaction force which is built up prevents the clamping motion element 3 in question from being further displaced relative to the housing 1. As the control member 4 moves further towards the left in FIG. 2, the surfaces 34 and 47 lift away from each other so that there is a spacing therebetween, as shown in FIG. 2, and the piston 2 in question is displaced into the associated cylinder chamber 20. That is possible for the reason that the supplied fluid take-up pressure is low and the fluid can also be re-distributed into remaining cylinder chambers. This ensures that all the clamping jaws 32 bear uniformly in contact with the workpiece W.

When all the clamping jaws 32 have engaged the workpiece W, they bear thereagainst with a low pressure which is determined by the fluid take-up pressure and which, by virtue of the distribution of the clamping jaws, acts uniformly around the periphery of the workpiece.

The control arrangement of the apparatus is now operated to cause the above-mentioned higher clamping pressure to be supplied to the cylinder chambers 20 by way of the ducts 43, 44 and 45 whereby the clamping pistons 2 displace the clamping motion elements 3 towards the left in FIG. 2 and thus towards the position shown in FIG. 3, with a high level of force, in order thereby firmly to clamp the workpiece W. As the workpiece W is clamped fast with the same force from all sides, the workpiece is clamped in position in a centered condition, in other words, there is no lateral displacement of the workpiece in the procedure for firmly clamping same in the definitively closed condition of the workpiece clamping apparatus.

FIG. 3 thus shows the fully closed position of the apparatus in which the above-mentioned abutment sensors 18 are operated by the contact of the surface 34 of the shoes 31 of the clamping motion elements 3 in order to respond to switch off the clamping pressure if one of the clamping jaws 32 has not gripped.

Figure 4:
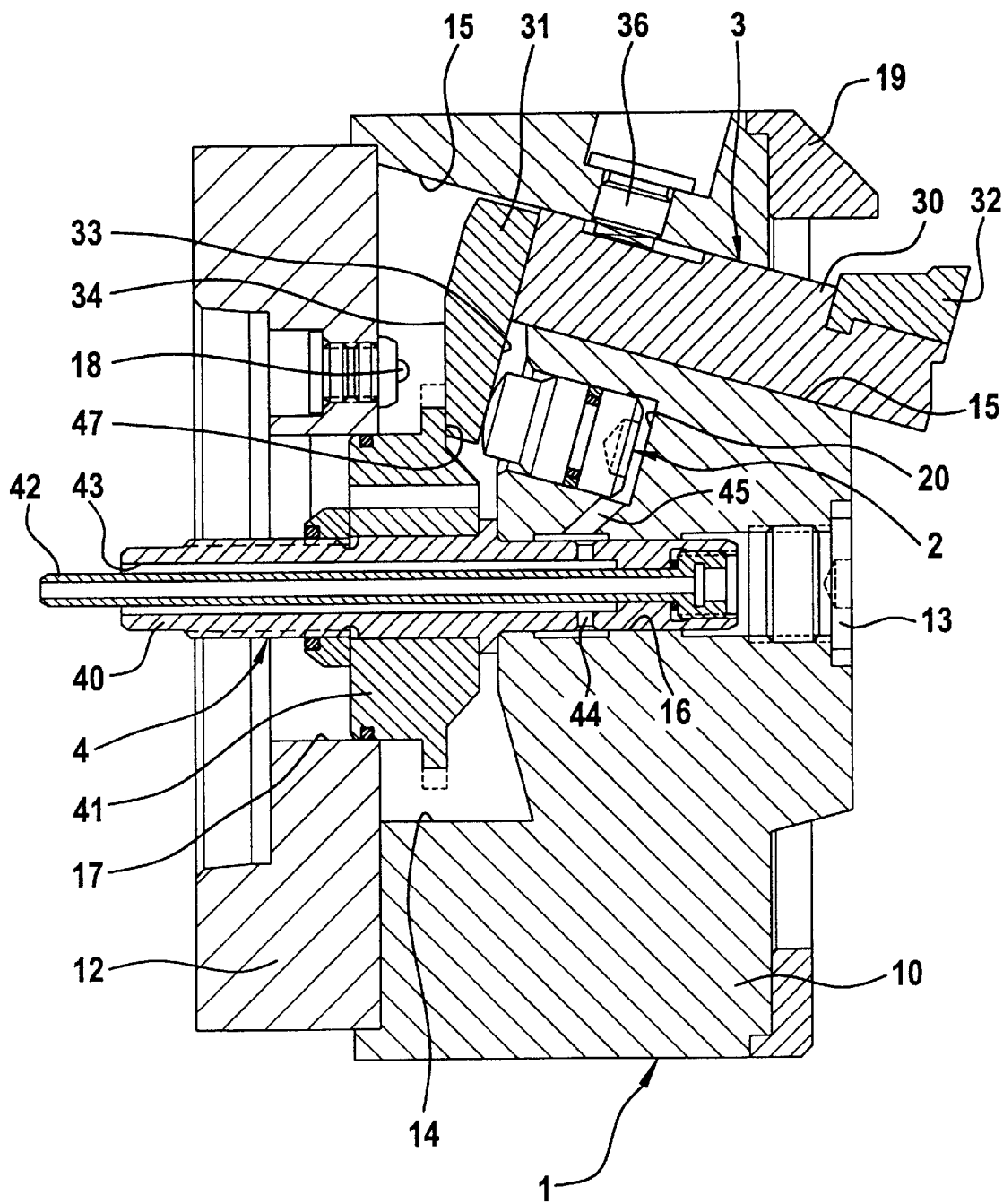
FIG. 4 is a view in axial section through a workpiece clamping apparatus in the form of an internal clamping apparatus in the open position.
Figure 5:
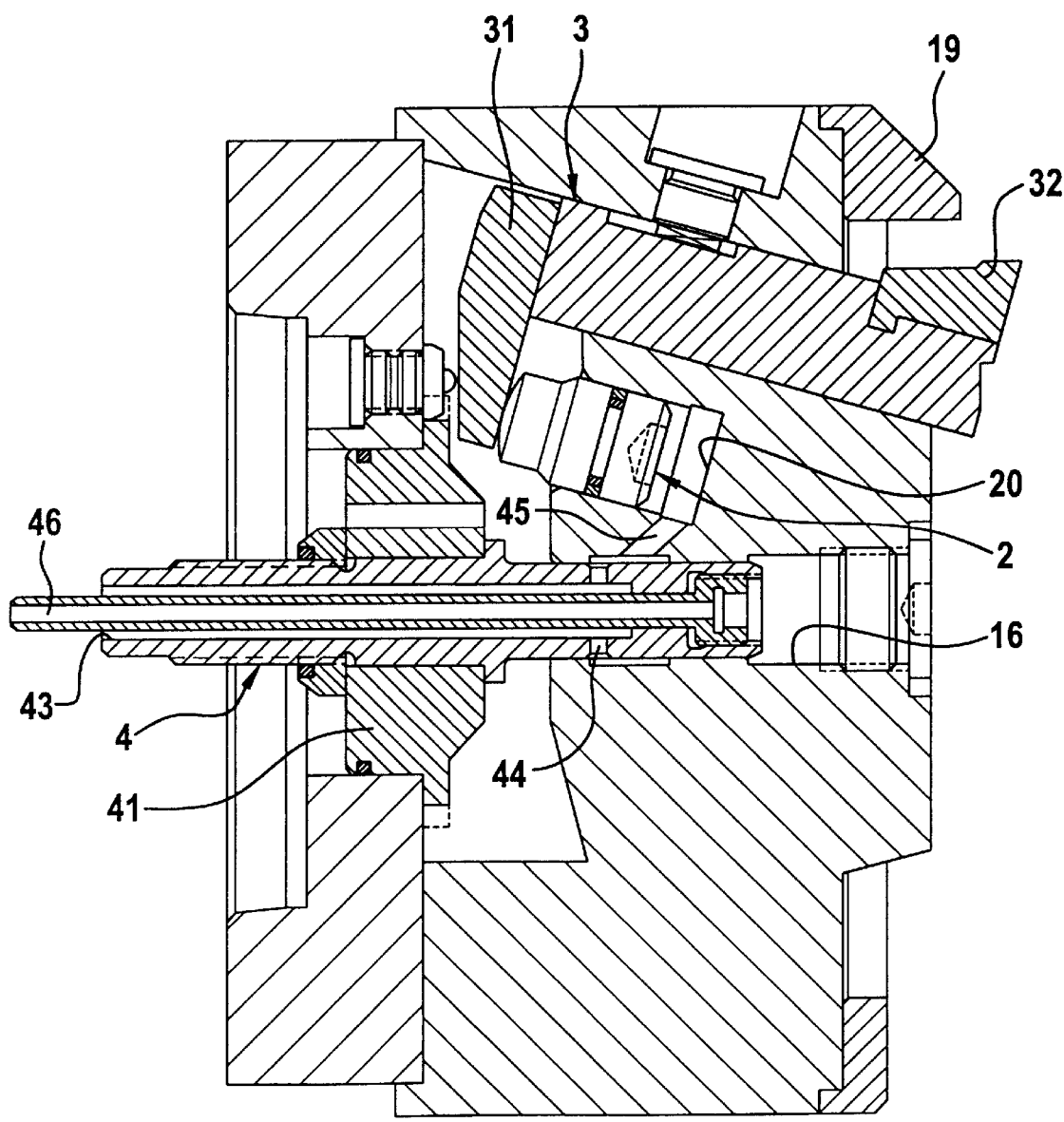
FIG. 5 shows the apparatus of FIG. 4 in a clamping position.
Figure 6:
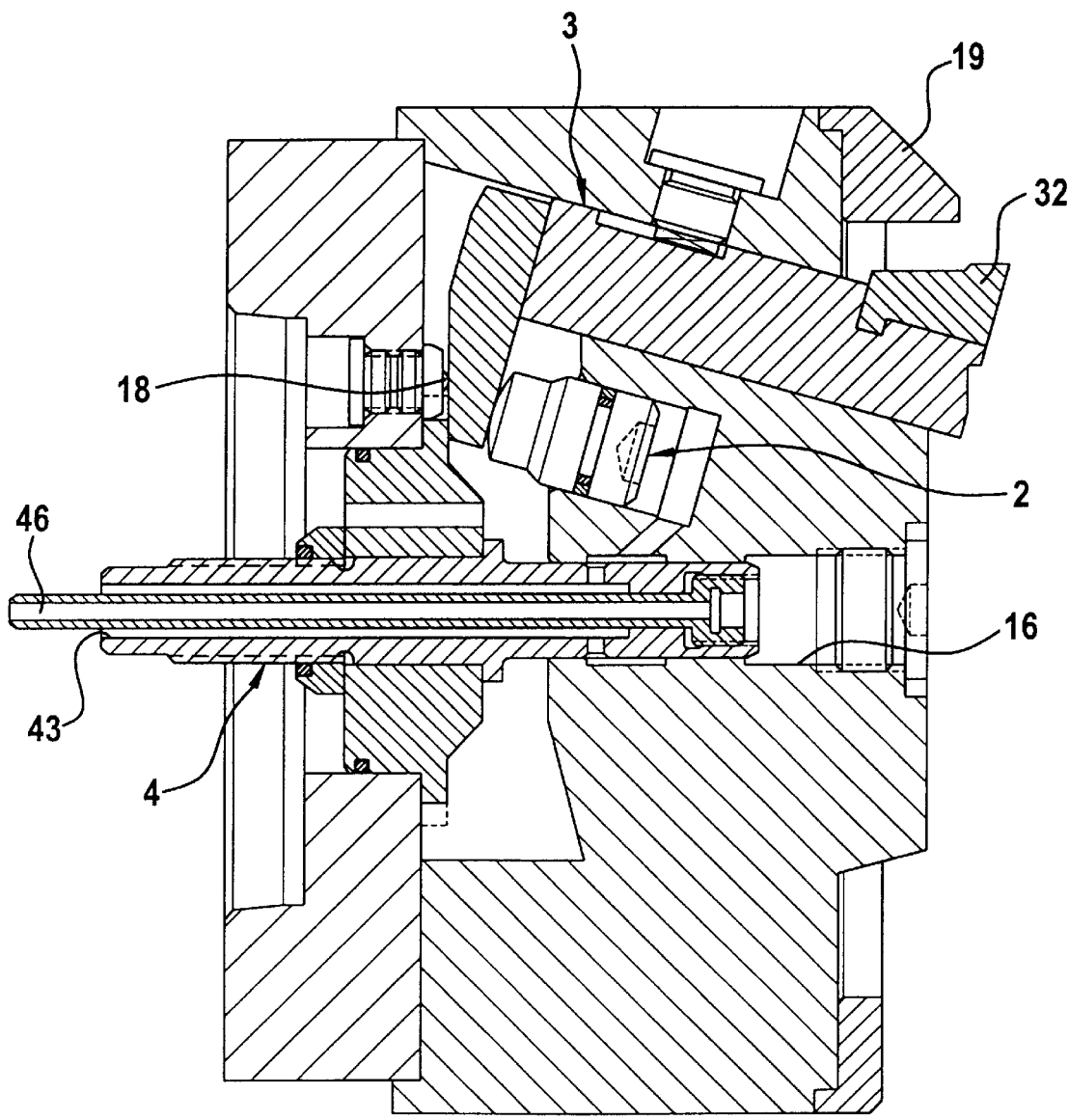
FIG. 6 shows the apparatus of FIG. 4 in a closed position.

Reference will now be made to FIGS. 4 through 6 showing that the workpiece clamping apparatus can also be in the form of an internal clamping apparatus having a mechanism for clamping for example hollow-cylindrical or virtually hollow-cylindrical workpieces from the interior.

It will be noted that parts in FIGS. 4 through 5 which correspond to those shown in FIGS. 1 through 3 and described hereinbefore with reference to FIGS. 1 through 3 are denoted by the same references. It is thought therefore that there is no reason for the foregoing detailed description of FIGS. 1 through 3 to be specifically repeated in every detail in relation to the embodiment of FIGS. 4 through 6. However, the following differences in the embodiment of FIGS. 4 through 6 are to be noted:

Whereas in the case of the structure shown in FIGS. 1 through 3 in the form of a clamping chuck, the clamping motion elements 3 and thus the guides 15 thereof are disposed on an envelope of the cone which opens towards the workpiece W to be clamped, in the embodiment of FIGS. 4 through 6 the guides 15 and the clamping motion elements 3 slidable therein are inclined in such a way as to be disposed on an envelope of a cone, the tip of which faces towards the workpiece W to be clamped and thus towards the right in FIGS. 4 through 6, while the clamping jaws 32 are mounted externally on the clamping motion elements 3. The pistons 2 are similarly arranged on an envelope of a cone which involves the same opening angle as the envelope of the cone at which the guides 15 and the clamping motion elements 3 are arranged. This is the construction shown in FIGS. 4 through 6. It will be appreciated that it is also possible for the pistons 2 to be arranged parallel to the axis of the apparatus, as in the case of the embodiment of FIGS. 1 through 3.

It will be appreciated that the positions and angles of inclination of the surfaces 33, 34 and 37 will also have to be suitably adapted, with a corresponding variation in the configuration of the disk 41 as can be clearly seen for example from FIG. 4.

It will be seen moreover that the counterpart support portions 19 are carried on the housing radially outwardly of the clamping jaws 32.

The structure of the embodiment shown in FIGS. 4 through 6 being self-evident in consideration of the foregoing specific description of the embodiment of FIGS. 1 through 3 and from consideration of FIGS. 4 through 6, it will be noted that the mode of operation of the embodiment of FIGS. 4 through 6 is in principle in the same fashion as in the case of the embodiment of FIGS. 1 through 3 to which reference is therefore suitably directed.

It will be appreciated that the above-described embodiments of the workpiece clamping apparatus according to the invention have been set forth solely by way of example and illustration of the principles thereof and that various other modifications may be made therein without thereby departing from the spirit and scope of the invention.

What is claimed is:

1. A workpiece clamping apparatus comprising:

a housing having an axial direction, guides extending in the housing in inclined relationship with respect to the axial direction as viewed in radial planes, a plurality of clamping motion elements adapted to be displaced along the guides, clamping jaws carried by the respective clamping motion elements, adapted to clamp a workpiece, a plurality of cylinder chambers in fixed relationship with the housing, a plurality of clamping pistons in respective ones of the cylinder chambers and each operatively associated with a respective clamping motion element, for effecting clamping of a workpiece, a displacement actuation means adapted to provide for movement of the clamping motion elements into a respective released position and a clamping readiness position, and fluid feed duct means for feeding fluid to the cylinder chambers for actuation of the clamping pistons therein, the fluid feed duct means extending in part by way of the displacement actuation means and adapted to permit control fluid to be fed to said cylinder chambers selectively without pressure or with take-up pressure or with clamping pressure.

2. Apparatus as set forth in claim 1 wherein the fluid feed duct means include first duct means which are fixed with respect to the housing and which each communicate with respective ones of said cylinder chambers, and wherein the displacement actuation means includes a slider having fluid distribution duct means for feeding said control fluid to said first duct means communicating with said cylinder chambers, said fluid distribution duct means constituting said part of said fluid feed duct means extending by way of said displacement actuation means.

3. Apparatus as set forth in claim 1 wherein the clamping motion elements each have a base portion and said displacement actuation means includes an actuating disk adapted to co-operate with the respective base portions of said clamping motion elements.

4. Apparatus as set forth in claim 1 wherein said inclined guides are in the form of bores.

5. Apparatus as set forth in claim 4 and further including limiting elements operatively associated with the clamping motion elements to limit the extent of the stroke movement thereof and restrict pivotal movement thereof.

6. Apparatus as set forth in claim 1 and further including a fluid control means which is adapted to feed pressureless fluid to said cylinder chambers for displacement of the clamping motion elements in their initial position and which is adapted to actuate said displacement actuation means in a direction for displacing fluid out of said cylinder chambers, the fluid control means being adapted for the clamping readiness position to feed fluid to the cylinder chambers under said take-up pressure thereby to hold the clamping motion elements in a condition of bearing against the displacement actuation means until the clamping jaws engage said workpiece, whereupon the clamping motion elements successively lift-off and clear from said displacement actuation means, and the fluid control means being adapted for the clamping pressure condition to feed clamping pressure to the cylinder chambers when all clamping motion elements have lifted-off and cleared said displacement actuation means.

7. Apparatus as set forth in claim 1 in the form of a clamping chuck wherein the clamping motion elements are disposed on an envelope of a cone which opens towards a said workpiece to be clamped, and further including a housing cover means mounted to said housing adjacent said clamping jaws and having support means for adaptation to a said workpiece to be clamped to support same externally thereof.

8. Apparatus as set forth in claim 1 in the form of an internal clamping apparatus wherein said clamping motion elements are disposed on an envelope of a cone whose tip faces towards a said workpiece to be clamped, and further including support means on said housing for adaptation to a said workpiece to be clamped to support same internally thereof.

9. A workpiece clamping apparatus comprising:

a housing having an axial direction and notional radial planes, guides extending in the housing in inclined relationship with respect to the axial direction as viewed in said radial planes, a plurality of clamping motion elements adapted to be displaced along the guides selectively into a workpiece-releasing initial position, a preliminary workpiece-clamping and centering position in readiness for clamping of the workpiece and a final workpiece-clamping position for definitive fixing clamping of the workpiece, clamping jaws carried by the respective clamping motion elements, adapted to clamp a workpiece in the workpiece-clamping positions of the clamping motion elements, a plurality of cylinder chambers in fixed relationship in the housing, a plurality of clamping pistons slidable in respective ones of the cylinder chambers and each operatively associated with a respective clamping motion element, the clamping pistons being hydraulically displaceable in said cylinder chambers to displace said clamping motion elements towards said workpiece-clamping positions, a displacement actuation means displaceable axially in the housing and adapted to permit movement of the clamping motion elements into their respective release position and their clamping-readiness position, and fluid feed duct means for feeding fluid to the cylinder chambers for hydraulic actuation of the clamping pistons therein, the fluid feed duct means extending in part by way of the displacement actuation means, and adapted to permit hydraulic fluid to be fed to said cylinder chambers in a selected one of the conditions without pressure, with take-up pressure and with clamping pressure.

\* \* \* \* \*